US006626686B1

(12) United States Patent
D'Souza et al.

(10) Patent No.: US 6,626,686 B1
(45) Date of Patent: Sep. 30, 2003

(54) INTEGRATED DOCKING TRAY

(75) Inventors: Melroy E. D'Souza, Lake Forest, CA (US); Anton R. Poole, Dakota Dunes, SD (US)

(73) Assignee: Gateway, Inc., Poway, CA (US)

( * ) Notice: Subject to any disclaimer, the term of this patent is extended or adjusted under 35 U.S.C. 154(b) by 0 days.

(21) Appl. No.: 09/476,470

(22) Filed: Dec. 30, 1999

(51) Int. Cl.$^7$ ................................................ A47B 81/00
(52) U.S. Cl. .................. 439/131; 312/223.3; 248/118.1; 248/918
(58) Field of Search .................. 439/131; 361/686, 361/727; 312/223.2, 223.3, 208.1; 108/50.02; 248/918, 118.1

(56) References Cited

U.S. PATENT DOCUMENTS

| | | | |
|---|---|---|---|
| 2,230,444 A | * | 2/1941 | Balster |
| 4,709,972 A | * | 12/1987 | LaBudde |
| 4,735,467 A | | 4/1988 | Wolters ........................ 312/29 |
| 4,742,429 A | * | 5/1988 | Arrendiell |
| 4,766,422 A | | 8/1988 | Wolters et al. ............... 340/700 |
| 4,931,978 A | * | 6/1990 | Drake et al. ................. 361/680 |
| 5,359,349 A | | 10/1994 | Jambor et al. ............... 345/168 |
| 5,377,951 A | | 1/1995 | Johnson et al. ............. 248/639 |
| 5,424,912 A | | 6/1995 | Mikan ......................... 361/680 |
| 5,452,950 A | | 9/1995 | Crenshaw et al. ........ 312/223.3 |
| 5,555,491 A | * | 9/1996 | Tao .............................. 361/686 |
| 5,564,668 A | | 10/1996 | Crowe, II ................. 248/284.1 |
| 5,651,594 A | | 7/1997 | Lechman ..................... 312/194 |
| 5,655,743 A | * | 8/1997 | Gillis ..................... 248/346.01 |
| 5,717,567 A | | 2/1998 | Tao .............................. 361/683 |
| 5,733,025 A | | 3/1998 | Jesse, Sr. .................. 312/223.3 |
| 5,771,814 A | | 6/1998 | Clausen ........................ 108/93 |
| 5,808,373 A | * | 9/1998 | Hamanishi .................. 307/10.1 |
| 5,850,539 A | | 12/1998 | Cook et al. .................. 395/500 |
| 5,859,762 A | * | 1/1999 | Clark et al. ................. 361/686 |
| 6,020,654 A | * | 2/2000 | Chutorash .................. 307/10.1 |
| D425,877 S | * | 5/2000 | Kochanski et al. ........ D14/447 |
| 6,113,050 A | * | 9/2000 | Rush ...................... 248/346.01 |
| 6,152,411 A | * | 11/2000 | Lundstrom ................ 248/291.1 |
| 6,163,079 A | * | 12/2000 | Miyazaki et al. ............. 439/34 |
| 6,169,655 B1 | * | 1/2001 | Helot .......................... 361/686 |
| 6,185,096 B1 | * | 2/2001 | Helot et al. ................. 361/686 |
| 6,202,568 B1 | * | 3/2001 | Kochanski et al. ....... 108/50.02 |

* cited by examiner

Primary Examiner—Neil Abrams
(74) Attorney, Agent, or Firm—Kevin E. West; Scott Charles Richardson; Suiter & Associates

(57) ABSTRACT

An integrated docking tray assembly capable of docking a portable computer, in particular a laptop or notebook computer, comprising a tray having a docking station integrated therein for docking the portable computer. The tray is mounted underneath a work surface such as a desktop, tabletop, cabinet, shelf, or the like so that it may move between a closed position substantially retracted beneath the surface and an open position at least partially extended from the surface. Thus, when the portable computer is received in the tray and docked to the docking station, its keyboard and display may be accessed for use when the tray is in the open position and stored in the tray underneath the desktop when the tray is in the closed position. The tray may further include a support for providing support to a user's wrists while the user is typing on the keyboard of the computer.

16 Claims, 3 Drawing Sheets

INTEGRATED DOCKING TRAY

FIELD OF THE INVENTION

The present invention relates generally to docking stations for portable computers such as laptop or notebook computers, and more specifically to an integrated docking tray assembly for docking such a portable computer.

BACKGROUND OF THE INVENTION

Portable computers have become increasingly popular because of the added mobility they provide compared to conventional "desk top" computer systems. These computers, often referred to as laptop or notebook computers, typically comprise a clam-shell type housing including a main body portion providing a keyboard and a lid portion having a built-in display. The main body portion and lid portion may be folded together allowing the computer to be carried from place to place by a user. However, because of their smaller size, portable computers are usually somewhat less convenient to use than conventional desktop computers. For example, a typical portable computer includes a more compact keyboard and display than is found in a comparable desktop computer system. Similarly, instead of a mouse, commonly used with desktop computers, the portable computer may use a point stick, touch pad, or trackball for input of cursor control information because such devices may be more easily housed within the portable computer's housing. Further, when utilized with a network, the portable computer must be physically connected to the network infrastructure before use, requiring the time consuming process of connecting cords or cables.

Consequently, it is often desirable to provide a docking station for the portable computer so that the computer may provide its user with many of the conveniences normally found in desktop systems. A typical docking station provides a power connection for powering the portable computer and/or recharging its internal batteries, expansion slots for allowing connection of the portable computer with drives which could not be placed within the computer's housing due to its size, and connections to peripheral devices such as an external monitor, a printer, a full-sized keyboard, a mouse, and the like. The docking station usually includes a docking mechanism that physically connects the portable computer to the docking station thereby coupling the computer to the features provided by the docking station in a single operation.

Presently, docking stations are placed on the user's desk, forcing the user to have the laptop computer on the desk while docked with the docking station. Besides occupying limited desk space, this arrangement may place the computer's keyboard in an uncomfortable position or height for typing. Further, the docking station is often connected to a separate monitor, which is used rather than the portable computer's display. Because the lid portion when raised may block the monitor and the desk may lack room to properly align the external monitor and the computer's keyboard while the computer is docked, the user may be forced to constantly switch his or her view from the keyboard to the monitor, resulting in unnecessary physical discomfort and fatigue.

Consequently, there exists a need for an improved docking station for a portable computer wherein the docking station and computer do not occupy needed desk space, and wherein the computer's keyboard may be placed in a more comfortable position for typing and may be more easily aligned with an external monitor to reduce unnecessary discomfort and fatigue.

SUMMARY OF THE INVENTION

Accordingly, the present invention provides an integrated docking tray assembly suitable for being mounted below a work surface such as a desktop, tabletop, cabinet, shelf, or the like, wherein the integrated docking tray assembly is capable of docking a portable computer, in particular a laptop or notebook computer. In an exemplary embodiment, the integrated docking tray assembly is comprised of a tray suitable for receiving the portable computer. A docking station is integrated into the tray for docking the portable computer. The tray is mounted underneath the work surface so that it may move between a closed position substantially retracted beneath the surface and an open position at least partially extended from the surface. Thus, when a portable computer is received in the tray and docked to the docking station, its keyboard and display may be accessed for use when the tray is in the open position and stored in the tray underneath the desktop when the tray is in the closed position.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which.

DETAILED DESCRIPTION OF THE INVENTION

Reference will now be made in detail to presently preferred embodiments of the invention, an example of which is illustrated in the accompanying drawings.

Figure 1:
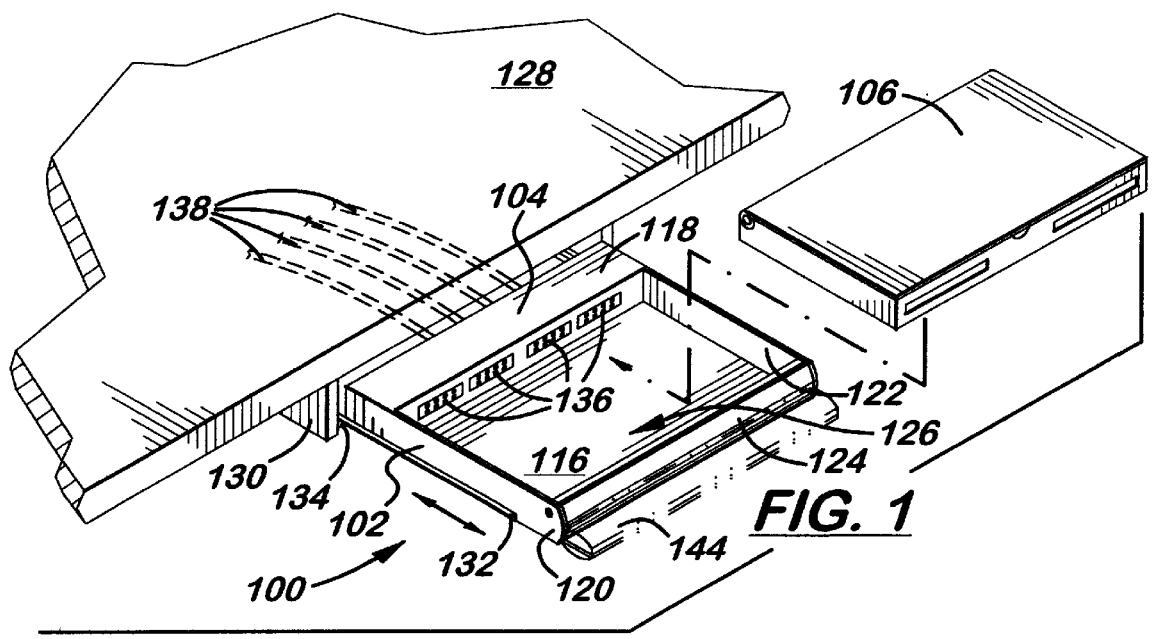
FIG. 1 is a perspective view illustrating an integrated docking tray assembly for docking a portable computer in accordance with an exemplary embodiment of the invention.
Figure 2:
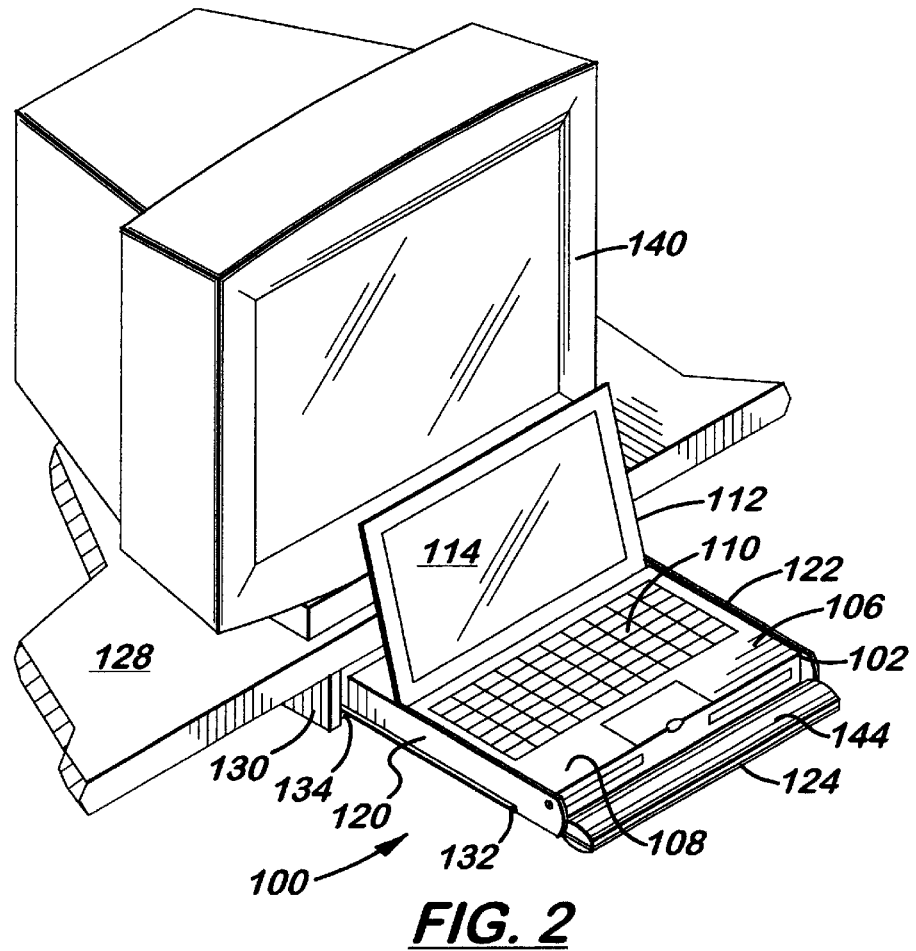
FIG. 2 is a perspective view illustrating the integrated docking tray assembly of FIG. 1, wherein a portable computer is inserted in the tray.
Figure 3:
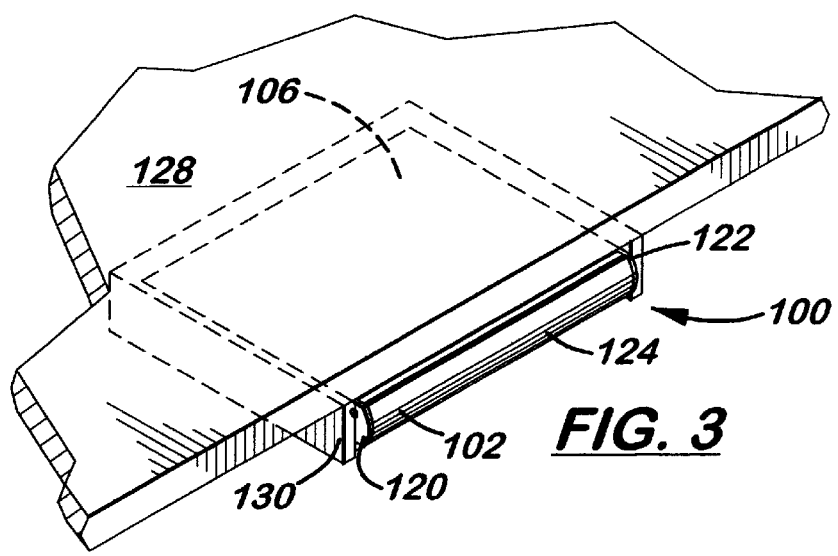
FIG. 3 is a perspective view illustrating the integrated docking tray assembly of FIG. 2, wherein the tray is retracted beneath the desktop surface.

Referring now to FIGS. 1, 2 and 3, an integrated docking tray assembly in accordance with an exemplary embodiment of the present invention is described. The integrated docking tray assembly 100 is comprised of a tray 102 having a docking station 104 integrated therein suitable for docking a portable computer 106 such as a laptop or notebook computer. As shown in FIGS. 1 and 2, such a portable computer 106 typically includes a main body portion 108 having a keyboard 110, and a lid portion 112 including a display 114. The lid portion 112 is pivotally hinged to the main body portion 108 allowing the lid portion 112 and main body portion 108 to be folded together for storage and transport of the computer 106. The lid portion 112 is rotated to a raised position during use so that the display 114 may be viewed, and so that the user may access the keyboard 110.

As shown in FIGS. 1 and 2, the tray 102 includes a bottom portion 116, a rear wall portion 118, left and right side wall portions 120 & 122, and front wall portion 124 forming an enclosure 126 having an open top and a generally box-like volume sized to hold both the docking station 104 and the portable computer 106. In an exemplary embodiment, the front wall portion 124 may pivot between an upright position, shown in FIG. 3, wherein the front of enclosure 126 is closed, and a generally horizontal position, shown in FIGS. 1 and 2, wherein the front of enclosure 126 is open. To insert a portable computer, such as portable computer 106, within the enclosure 126, the front wall portion 124 is pivoted to the horizontal or open position. The portable computer 106 is then inserted into the enclosure 126 though the enclosure's open top and front, and slid rearward until it engages and is docked with the docking station 104.

As shown in FIGS. 1, 2 and 3, the tray 102 is mounted below the desktop surface 128 by a suitable mounting device such as a bracket 130 attached to the underside of the surface 128 by fasteners such as screws, bolts, adhesive, or the like (not shown). In an exemplary embodiment, the tray 102 slides within the bracket 130 between an open position, shown in FIGS. 1 and 2, wherein the tray 102 is at least partially extended from the surface 128, and a closed position, shown in FIG. 3, wherein the tray 102 is substantially retracted beneath the surface 128. Each side wall portion 120 & 122 of tray 102 may include a rail 132 that engages a rail guide 134 formed in the bracket 130 to guide the sliding motion of the tray 102 as it is extended or retracted. If desired, the rail guides 134, or alternately the rails 132, may include rollers, wheels or like friction reducing devices (not shown) for reducing the effort required to slide the tray 102.

In an alternate embodiment, instead of using bracket 130, the tray 102 may be mounted below the desktop surface 128 as a drawer contained within the structure of the desk itself, much like the "pencil drawer" found in conventional desks. In this manner, the integrated docking tray assembly of the present invention may be provided as an integral part of a desk that is customized for users of portable computers, such as portable computer 106.

Preferably, enclosure 126 has a depth slightly greater than the thickness of the portable computer 106 when the computer's main body portion 108 and lid portion 112 are folded together. In this manner, the portable computer 106 may be completely contained within the enclosure 126 so that rear wall portion 118, left and right side wall portions 120 & 122, and front wall portion 124 extend slightly above the top of the computer 106. Thus, the tray 102 may be closed, i.e., retracted beneath surface 128, while the portable computer 106 is contained within the enclosure 126 and docked to docking station 104 provided the computer's lid portion 112 is closed.

In an exemplary embodiment, shown in FIG. 1, the docking station 104 is positioned adjacent to the rear wall portion 118 of tray 102. The docking station 104 includes one or more docking connectors 136 configured to mate with corresponding connectors mounted to the housing of the portable computer 106. Exemplary docking connectors 136 may comprise any type of connector, or combination of connectors, suitable for use in docking a portable computer including, but not limited to, RS-232 connectors, DB (data bus) connectors, coaxial (F) connectors, USB (Universal Serial Bus) connectors, DIN (Deutsch Industrie Norm) connectors, specialized multi-pin docking connectors, and/or edge connectors.

External connectors mounted to the back of the docking station 104 allow for connection of cords or cables 138 for interconnecting the docking station, and portable computer 106 when docked, to external peripheral devices and services. The external connectors may be identical to corresponding docking connectors 136 with which they are interconnected. This allows the docking connectors 136 to be replicated by an identical connector in the rear wall portion 118 of tray 102 for attachment of a line or cable 138 that could also be attached directly to the portable computer 106. Alternately, any or all of the external connectors may be a different type or style of connector than the corresponding docking connector 136. In one embodiment, shown in FIGS. 1, 2 and 3, the tray 102 and docking station comprise a single unit so that the rear wall portion 118 of tray 102 forms the back of docking station 104. In another embodiment, the tray 102 and docking station 104 may be physically separate. The rear wall portion 118 of tray 102 may include one or more apertures or holes (not shown), through which cords or cables 138 may be coupled to the external connectors of the docking station.

The portable computer 106 is docked with docking station 104 by first rotating the front wall portion 124 to its open (horizontal) position. The portable computer 106 is then inserted into the enclosure 126 though the enclosure's open top and front, and slid rearward so that connectors mounted to its housing engage one or more of the connectors 136 of docking station 104. In this manner, the docking station 104 allows a user to interconnect the portable computer 106 with external peripheral devices and services (for example, an external monitor 140, a keyboard, an external drive, a printer, an alternating current (AC) power adapter, a network, or the like (not shown)) via a single interconnection operation instead of connecting each device separately (i.e., independently connecting a line and connector from each device to a corresponding connector on the portable computer 106).

Figure 4:
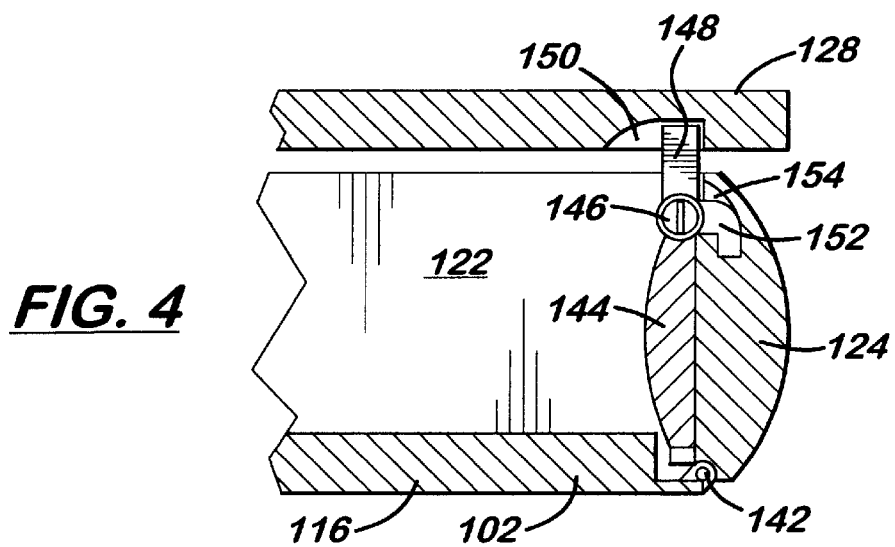
FIG. 4 is a partial cross-sectional side elevational view illustrating a wrist support for supporting a user's wrists while typing and a locking mechanism for securing the portable computer within the integrated docking tray assembly.
Figure 5:
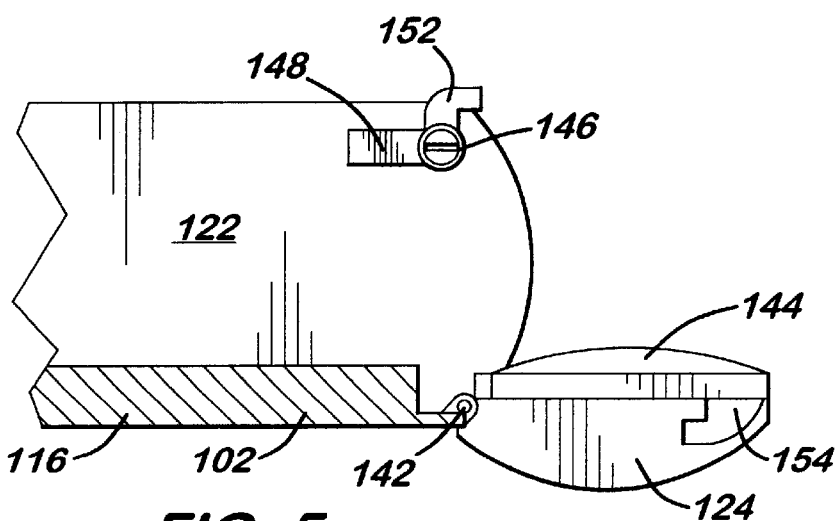
FIG. 5 is a partial cross-sectional side elevational view further illustrating the wrist support and locking mechanism shown in FIG. 4.

Referring now to FIGS. 4 and 5, the front wall portion 124 of tray 102 is described in detail. In an exemplary embodiment, a hinge 142 such as a piano hinge or the like hinges the front wall portion 124 to the front edge of the bottom portion 116 of tray 102. The hinge 142 allows the front wall portion 124 to pivot between the closed position, shown in FIG. 4, and the open position, shown in FIG. 5 wherein the front wall portion 124 extends horizontally outward from, and is generally parallel to, the bottom portion 116 of tray 102. The hinge 142 may include one or more stops for preventing rotation of the front wall portion 124 past the upright (closed) and horizontal (open) positions.

While in the open position, the front wall portion 124 functions as an integral wrist support for supporting the user's wrists, for example, while typing on the portable computer's keyboard 110 (see FIG. 2). In one embodiment, cushioning or padding 144 may be providing on the inner (upper) surface of the front wall portion 124 to increase the comfort of the user. Alternately, when in the closed position, shown in FIG. 4, the front wall portion 124 prevents removal of the portable computer 106 (FIGS. 1 and 2) from the integrated docking tray assembly 100. As shown in FIGS. 1 and 2, enclosure 126 may be sized so that its length and width are only slightly greater than the length and width of the portable computer 106. When the portable computer 106 is inserted in tray 102 and docked to docking station 104, and the front wall portion 124 is rotated to the closed position, the portable computer 106 is held against the docking station 104 so that it can not be moved sufficiently to disengage connectors 136 preventing removal of the portable computer 106, even when the tray is in the open position. Optionally, one or more appendages (not shown) may be provided which engage the housing of the portable computer 106 to retain the computer 106 within the tray 102 while the front wall portion 124 is closed.

The tray 102 may further include a locking mechanism 146 such as a key lock, combination lock, or the like for securing the portable computer 106 against theft or tampering when the computer 106 is left unattended. As shown in FIGS. 3, 4 and 5, the locking mechanism 146 allows the portable computer 106 to be secured within enclosure 126 by locking the front wall portion 124 and/or tray 102 in their closed or retracted positions (see FIG. 3). In an exemplary embodiment, the locking mechanism 146 is mounted in a side wall portion 120 or 122 of tray 102 and comprises a key operated lock coupled to bolts 148 & 152 which rotate to engage slots 150 & 154, respectively, formed in the bottom of desktop surface 128 and front wall portion 124, respectively, when the locking mechanism 146 is locked.

A user may secure the portable computer 106 within the tray 102 by first moving the front wall portion 124 to its closed (upright) position and then locking the locking mechanism 146. As shown in FIG. 4, locking of the locking mechanism causes bolt 152 to engage slot 154, holding the front wall portion 124 in the closed (upright) position so that the computer 106 cannot be removed from the tray 102. If tray 102 is extended when locked, as shown in FIGS. 1 and 2, bolt 148 is not engaged in slot 150. This allows the portable computer 106 to be secured within the tray 102 while the tray is extended, thereby permitting access to the computer's keyboard 110 and display 114. If, on the other hand, tray 102 is retracted when locked, as shown in FIG. 3, locking of the locking mechanism 146 further causes bolt 148 to engage slot 150, securing the tray 102 in the retracted position beneath surface 128 and preventing all access to the computer 106 until the locking mechanism 146 is again unlocked.

Figure 6:
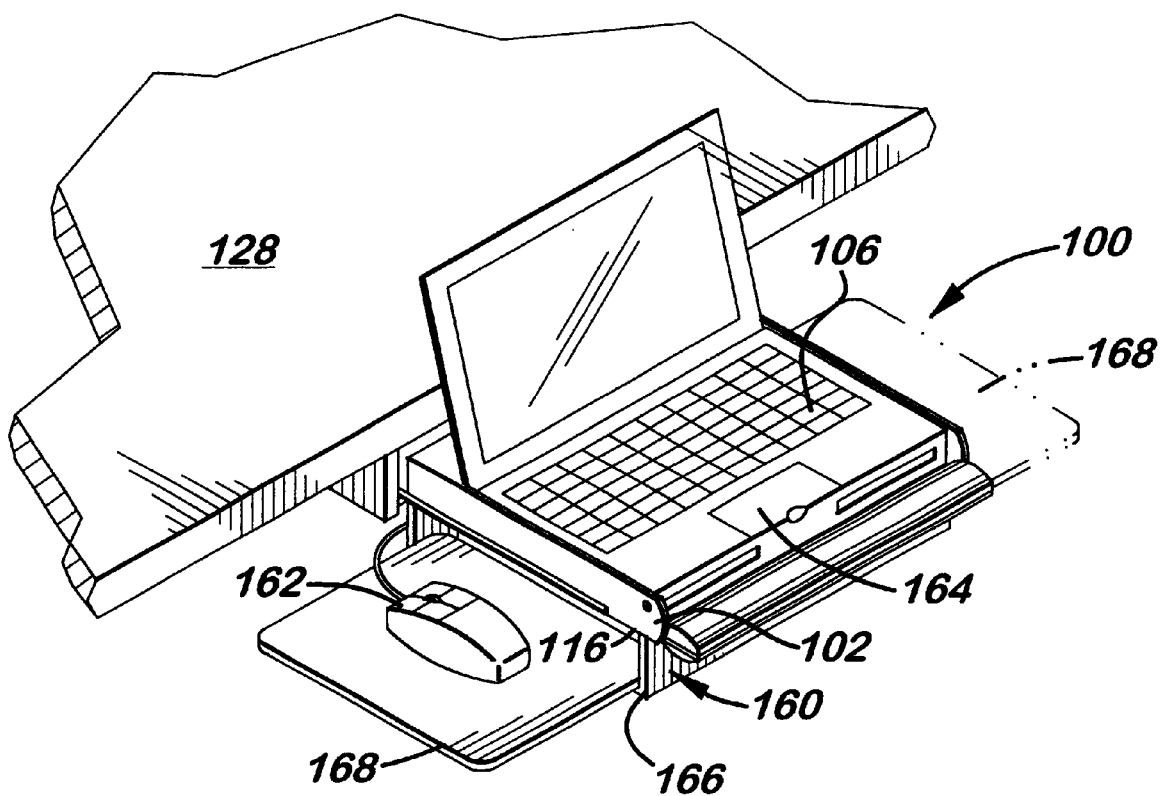
FIG. 6 is a partial perspective view illustrating an integral docking tray having a mouse pad support in accordance with an exemplary embodiment of the present invention.

Referring now to FIG. 6, an embodiment of the integrated docking tray assembly is shown wherein the tray further includes a mouse pad support. The mouse pad support 160 allows a user of the portable computer 106 to use a conventional mouse 162 instead of the computer's cursor control device 164 (a touch pad is shown) while the computer 106 is docked in the integrated docking tray assembly 100. The mouse pad support 160 also provides a means of conveniently storing the mouse 162 when not it is in use so that the mouse 162 does not clutter desktop surface 128.

In an exemplary embodiment, the mouse pad support 160 is comprised of a flattened, generally U-shaped bracket 166 mounted to the bottom portion 116 of tray 102. A mouse tray 168 is mounted to, and slides within, the bracket 166. The mouse tray 168 provides a surface on which a user of the portable computer 106 may manipulate the mouse 162. Preferably, the mouse tray 168 may be extended from either side of the bracket 166 thereby permitting both left and right handed use of the mouse 162. Further, when the mouse 162 is not being used, the mouse tray 168 and mouse 162 may slide within the bracket 166 so that the integrated docking tray assembly 100 may be closed, i.e., retracted beneath surface 128 and optionally locked.

Referring generally now to FIGS. 1 through 6, it can be seen that while the portable computer 106 is received in tray 102 and docked to docking station 104, its keyboard 110 and display 114 can be accessed for use when the tray 102 is extended to the open position, and can be stored in the tray's enclosure 126 when the tray 102 is retracted to the closed position. Thus, when a user wishes to use the portable computer 106 at his or her desk, the user would simply extend the tray 102 and insert the portable computer 106, sliding the computer 106 rearward until it is docked with the docking station 104. The user may then open the lid portion 112 and power the computer 106 on. If the user must leave the portable computer 106 unattended, the user may temporarily secure the computer 106 against theft by closing and locking the front wall portion 124 of the tray 102. When the user no longer wishes to use the portable computer 106 at that location, he or she may undock the computer 106 and remove it from the tray 102 so that it may be carried to another location. Alternately, the user may leave the computer 106 inside the tray 102, close the lid portion 112 of the computer 106, and push the tray 102 to its retracted position beneath the desktop surface 128. The user may then secure the portable computer 106 within the tray 102 by locking the tray 102 in the retracted position.

As shown in FIGS. 1, 2, 3 and 6, the integrated docking tray assembly of the present invention allows the portable computer 106 and its docking station 104 to be removed from the user's desktop surface 128 thereby reducing clutter and providing the user with additional work space. Further, as shown in FIG. 2, if an external monitor 140 is utilized with the portable computer 106, the monitor 140 may be more easily aligned with the computer so that the portable computer's keyboard 110 is placed in front of the monitor 140, allowing a more natural eye/head movement while typing and reducing user fatigue.

It will be appreciated that the integrated docking tray assembly 100 of the present invention may be mounted to any structure providing a suitable work surface such as a desk, table, computer stand or cart, shelf, or the like. Thus, as utilized herein and in the appended claims, the terms "desk" and "desktop" should be construed to encompass structures such as a desk, a desk return, a table, a shelf, a cabinet, a computer stand, a computer cart, or the like as contemplated by one of ordinary skill in the art.

It is believed that the integrated docking tray assembly of the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. An integrated docking tray assembly, comprising:
 a tray including an enclosure having an open top suitable for receiving a portable computer and a front wall portion capable of pivoting between a closed position and an open position;
 a mounting device for mounting said tray beneath a desktop surface, said mounting device capable of allowing said tray to move between a closed position substantially retracted beneath said surface and an open position at least partially extended from said surface; and a docking station integrated into said tray, said docking station suitable for docking the portable computer via a single interconnection operation when the portable computer is received in said enclosure;

wherein said front wall portion holds the portable computer against said docking station when said front wall portion is in the closed position for preventing removal of the portable computer from said enclosure.

2. The integrated docking tray assembly as claimed in claim 1, the portable computer received in said enclosure including a display and a keyboard, wherein accessing the portable computer for use comprises accessing the keyboard, and wherein said front wall portion forms a wrist support when said front wall portion is in the open position.

3. The integrated docking tray assembly as claimed in claim 2, further comprising a lock for locking said front wall portion in said closed position.

4. The integrated docking tray assembly as claimed in claim 2, further comprising a mouse pad support, the mouse pad support including a bracket mounted to said tray and a mouse tray for supporting a mouse so the mouse can be manipulated by a user of the portable computer, the mouse tray being slidably received in said bracket so that said mouse tray may be retracted into and extended from said bracket.

5. The integrated docking tray assembly as claimed in claim 4, wherein said mouse tray may be extended to either side of said bracket.

6. The integrated docking tray assembly as claimed in claim 1, further comprising a mouse pad support, the mouse pad support including a bracket mounted to said tray and a mouse tray for supporting a mouse so the mouse can be manipulated by a user of the portable computer, the mouse tray being slidably received in said bracket so that said mouse tray may be retracted into and extended from said bracket.

7. The integrated docking tray assembly as claimed in claim 6, wherein said mouse tray may be extended to either side of said bracket.

8. The integrated docking tray assembly as claimed in claim 1, wherein said mounting device comprises rails configured to allow said tray to slide between the closed position and the open position.

9. The integrated docking tray assembly as claimed in claim 1, further comprising at least one connector coupled to said integrated docking tray assembly and configured for attachment to an external cable.

10. A desk with an integrated docking tray assembly for a portable computer, the desk comprising:

a desktop surface;

a tray including an enclosure having an open top suitable for receiving the portable computer and a front wall portion capable of pivoting between a closed position and an open position;

a mounting device for mounting said tray beneath the desktop surface, said mounting device capable of allowing said tray to move between a closed position substantially retracted beneath said surface and an open position at least partially extended from said surface; and a docking station integrated into said tray, said docking station suitable for docking the portable computer via a single interconnection operation when the portable computer is received in said enclosure;

wherein said front wall portion holds the portable computer against said docking station when said front wall portion is in the closed position for preventing removal of the portable computer from said enclosure.

11. The desk as claimed in claim 10, wherein said portable computer includes a display and a keyboard, wherein accessing the portable computer for use by pivoting the front wall to the open position allows access to said keyboard, and wherein the front wall portion forms a wrist support when in the open position.

12. The desk as claimed in claim 11, further comprising:

a lock for locking said front wall portion in said closed position.

13. The desk as claimed in claim 10, further comprising:

a mouse pad support including a bracket mounted to said tray and a mouse tray for supporting a mouse so the mouse can be manipulated by a user of the portable computer, the mouse tray being slidably received in said bracket so that said mouse tray may be retracted into and extended from said bracket.

14. The desk as claimed in claim 11, wherein said mouse tray may be extended to either side of said bracket.

15. The desk as claimed in claim 10, further comprising at least one connector coupled to said docking station and configured for attachment to an external cable.

16. The desk as claimed in claim 10, wherein said mounting device comprises rails configured to allow said tray to slide between the closed position and the open position.

\* \* \* \* \*